United States Patent [19]
Hayes, Thomas Edward

[11] 3,938,017
[45] Feb. 10, 1976

[54] ANTI-RESET WINDUP PROPORTIONAL AND INTEGRAL CONTROLLER

[75] Inventor: Thomas Edward, Hayes, Goshen, Ind.

[73] Assignee: Johnson Service Company, Milwaukee, Wis.

[22] Filed: Mar. 5, 1974

[21] Appl. No.: 448,365

[52] U.S. Cl. .............................. 318/610; 236/78 D
[51] Int. Cl.² ....................................... G05B 11/42
[58] Field of Search ............ 236/15 B, 78; 318/609, 318/610

[56] References Cited
UNITED STATES PATENTS

| | | | |
|---|---|---|---|
| 2,668,264 | 2/1954 | Williams, Jr. | 318/610 X |
| 3,221,257 | 11/1965 | Ohlson | 236/78 X |
| 3,391,317 | 7/1968 | Bell | 318/611 |
| 3,819,999 | 6/1974 | Platt | 318/610 X |

Primary Examiner—William E. Wayner
Attorney, Agent, or Firm—Johnson, Dienner, Emrich & Wagner

[57] ABSTRACT

An anti-reset windup proportional plus integral controller connectable in a proportional control loop of a process control system includes a proportional amplifier circuit and an integrating amplifier circuit responsive to a command signal to provide proportional and integral signals, respectively, which are summed by a summing amplifier to provide a modified command signal having a proportional and an integral component. A signal comparator means compares the modified command with a pair of reference signals which define an output range for said summing amplifier and disables the integrating amplifier circuit, permitting the integrating amplifier circuit to unwind whenever the modified command signal is not within the output range.

16 Claims, 3 Drawing Figures

FIG. 3

ANTI-RESET WINDUP PROPORTIONAL AND INTEGRAL CONTROLLER

BACKGROUND OF THE INVENTION

1. Field of the Invention

This invention relates to proportional control systems, and more particularly to a proportional plus integral controller which avoids reset windup.

2. Description of the Prior Art

Proportional controllers are employed in process control systems to enable a controlled system variable to be maintained at a system set point by providing a feedback signal related in amplitude and polarity to deviations of the controlled variable from the set point.

In such systems, the controlled variable is monitored by a condition sensing device which provides a linearly changing command signal indicative of deviations of the controlled variable from the system set point. A process control apparatus is responsive to the command signal to effect an adjustment in the value of the manipulated variable to maintain the controlled variable at the system set point.

In known proportional controllers which provide only proportional action, the deviation of the controlled variable from the set point, or error, is never fully eliminated since it is necessary for an error to exist to command a system output other than the one neutral output at which the system was calibrated. This inherant deviation between the actual process condition, or controlled variable, and the desired process condition, or set point, is commonly referred to as "droop". In comfort control loops, for example, a relatively small droop can be felt by human occupants of a temperature controlled space.

Droop may be lowered through the use of a high gain amplifier in the proportional control loop. However, system stability requirements place a limit on the highest attainable gain and thus, on the minimum droop. Droop is eliminated through the use of controllers which provide proportional plus automatic reset action, sometimes called integral action.

Although proportional plus integral controllers provide the desired elimination of droop, control loops empolying an automatic reset control function are characterized by large overshoots in the event of process upsets as may be caused by start-up or large changes in load or set point, for example.

In some applications, it is desirable to prevent a proportional plus integral controller from acquiring a saturated condition in the integrator if the system being controlled is in a saturated condition such that the controlled variable is outside the control band for an extended period. For example, in the case where a proportional plus integral controller is employed to control the operation of a steam boiler or chiller a large overshoot may occur when the system is overloaded. Such condition occurs, for example, when a steam boiler operating at maximum capacity under heavy load cannot hold the steam pressure at the system set point so that the pressure is several degrees below the normal control set point.

If then the load is suddenly dropped, the pressure returns to the set point rapidly, but an integrator in the system, having accumulated maximum output, cannot begin to unwind until the set point is passed and the steam pressure is caused to increase above the set point. During the unwinding of the integrator, the system continues to operate at high capacity and the excessive overshoot may cause damage.

Therefore, it is desirable to have a proportional plus integral controller for use in a proportional control system, which provides an anti-reset windup function to eliminate the effect of reset windup in an integrator of the proportional plus integral controller.

It is also desirable to provide a proportional plus integral controller which may be included in an existing proportional control loop by simply cutting the lines between a controller sensor and an actuator controller.

It is also desirable to be able to retain the set point and proportional gain control of such existing proportional control loop in the proportional sensor controller.

SUMMARY OF THE INVENTION

It is therefore an object of the present invention to provide a proportional plus integral controller for use in a process control system which automatically eliminates reset windup.

It is another object of the present invention to provide a proportional plus integral controller which may be inserted directly into an existing proportional control loop between a proportional sensor controller and command actuator, and which provides bumpless forward transfer from proportional only operation to proportional plus integral operation.

It is yet another object of the present invention to provide a proportional plus integral controller for use in a conventional proportional control loop between a proportional sensor controller means and a command actuator in which set point and gain adjustments of the conventional proportional control loop remain operational.

These and other objects are achieved by the present invention which has provided a proportional plus integral controller for use in a process control system having a proportional control loop including a sensor controller and an actuator operable to maintain a controlled process variable at a system set point. The sensor controller provides a linearly changing command signal indicating deviations of the controlled variable from the set point and the actuator is responsive to the command signal to control a manipulated process variable to effect a change in the controlled variable to return the controlled variable to the set point.

In accordance with one embodiment, the proportional plus integral controller is connected into the lines between the sensor controller and the actuator and is normally operable to be responsive to the command signal to provide a modified command signal, having a proportional component and an integral component, for the actuator. Whenever the value of the controlled variable is outside of the proportional band of the system, such that the integrator becomes saturated, an integrating means of the integrator is automatically disabled whereby the controller provides only a proportional signal until the controlled variable is again within the proportional band.

In accordance with an exemplary embodiment, the proportional plus integral controller comprises proportional amplifier means responsive to the command signal for providing a signal proportional to the command signal, an integrating amplifier means having an associated integrating capacitor which provides a signal proportional to the time integral of the command signal, and summing means for combining the proportional and integral components provided by the proportional and integrating amplifier means to provide a modified command signal which is extended to the actuator controller. In addition, a comparator means is operable to monitor the output of the summing means, and to disable the integrating amplifier means whenever the output of the summing means exceeds a predetermined maximum value or falls below a predetermined minimum value. Whenever the integrating amplifier means is disabled, the associated integrating capacitor is discharged thereby unwinding the integrating amplifier means.

Accordingly, whenever the command signal is within a predetermined range, the integral controller provides an output having both proportional and integral components. On the other hand, whenever the command signal is not within the proportional band of the system, the integrating amplifier means is disabled, and the proportional plus integral controller provides only a proportional output signal while the integrating means is unwound. As soon as the command signal again returns to the proportional band, the integrating means is enabled to provide an integral component which is added to the proportional component.

The proportional plus integral controller can be inserted into a conventional proportional control loop and requires minimal alteration of normal proportional application procedures. In such application, the sensor controller set point and gain adjustments remain operational. Moreover, the initial gain adjustment procedure for a conventional proportional control loop modified to include the proportional plus integral controller is similar to that established for the proportional control loop without the controller.

The proportional plus integral controller may be inserted directly into the lines which normally interconnect the sensor controller and the actuator. In such case, the power for the unit is furnished by those lines. Thus, installation procedures are considerably simpler than those required for known commercially available proportional plus integral controllers.

DESCRIPTION OF A PREFERRED EMBODIMENT

Figure 1:
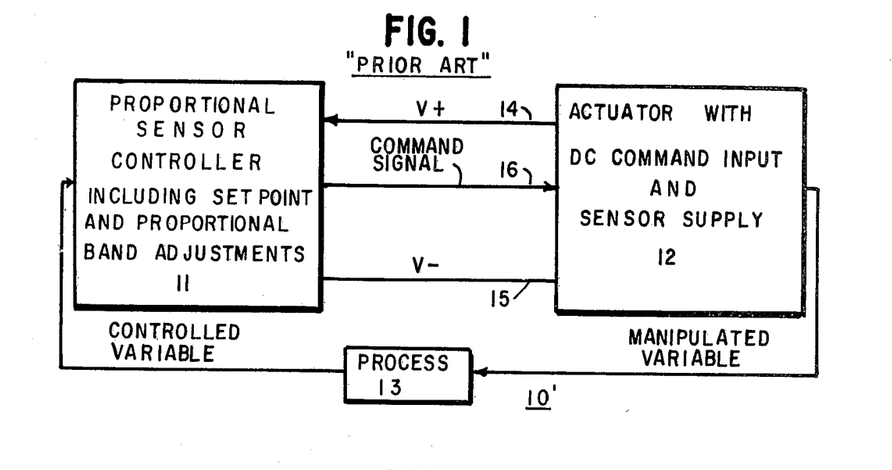
FIG. 1, labelled "prior art," is a simplified block diagram of a known proportional control system.

Referring to FIG. 1, which is labelled "Prior Art," there is shown a block diagram of a typical automatic control system 10' having a proportional controller connected in a proportional control loop. The proportional control loop includes a proportional sensor controller 11 and an actuator 12 which enable a controlled process variable to be maintained at a system set point.

By way of example, the process, represented by block 13, may be a control system for a steam boiler. In such system, the manipulated variable may be the amount of heating in the boiler which is controlled by the actuator 12, and the controlled variable may be steam pressure in the boiler. In such application, the proportional sensor controller 11 may include a pressure sensing device which provides an output proportional to the difference between steam pressure in the boiler and a pressure set point. This output is the command signal for the actuator 12. The proportional controller 11 is responsive to command signals within a preselected proportional band as determined by a proportional band adjust associated with the proportional sensor controller 11.

The proportional sensor controller 11 receives power from the actuator circuit 12 over conductors 14 and 15, and the command signal, provided by the proportional sensor controller 11, is extended to the actuator 12 over a conductor 16. This signal is referenced to the potential of conductor 14 which is normally grounded. The actuator 12 is responsive to the command signal to effect a change in the manipulated variable to permit an increase or decrease in the amount of heating supplied to the steam boiler. Such action effects a change in the controlled variable, or steam pressure, as the pressure of the boiler increases or decreases causing the controlled variable to approach the system set point and correspondingly effecting a decrease in the error signal.

Figure 2:
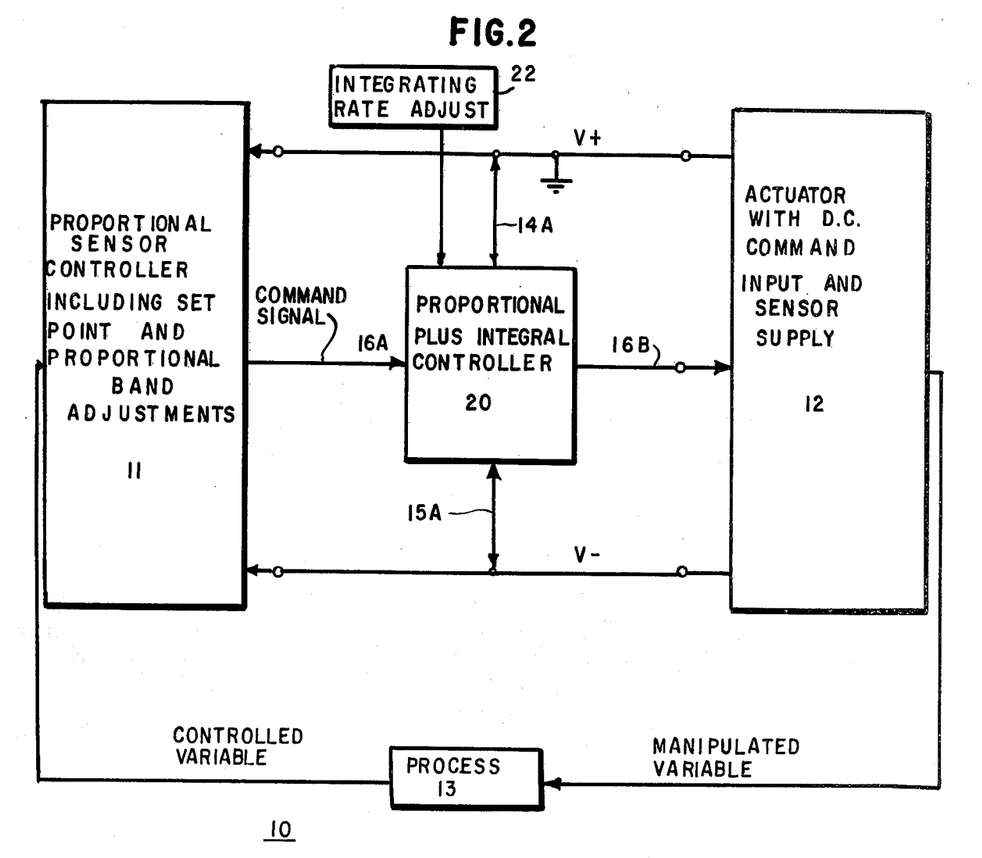
FIG. 2 is a simplified block diagram of the proportional control system shown in FIG. 1, which includes proportional plus integral controller provided by the present invention; and, FIG. 3 is a schematic circuit diagram of the proportional plus integral controller provided by the present invention.

Referring to FIG. 2, there is shown a block diagram of an automatic control system 10 including a proportional plus integral controller circuit 20 provided by the present invention which is inserted into a conventional proportional control loop of a process control system, such as the one shown in FIG. 1.

As shown in FIG. 2, the proportional plus integral controller 20 is interposed between the proportional sensor controller 11 and the actuator circuit 12. The controller 20 obtains power from the actuator circuit 12 over conductors 14A and 15A. The command signal provided by the proportional sensor controller 11 is extended to the controller over a conductor 16A.

Alternatively, the controller 20 may include a separate power supply (not shown) and a LVDT voltage transmitting sensor, thus isolating the controller 20 from the rest of the controlled system except for two-wire inputs and outputs for the command signal.

The system set point and proportional band adjustments of the system of FIG. 1 remain operational, such adjustments being made by the set point control and the proportional band adjust control associated with the proportional sensor controller 11.

Figure 3:
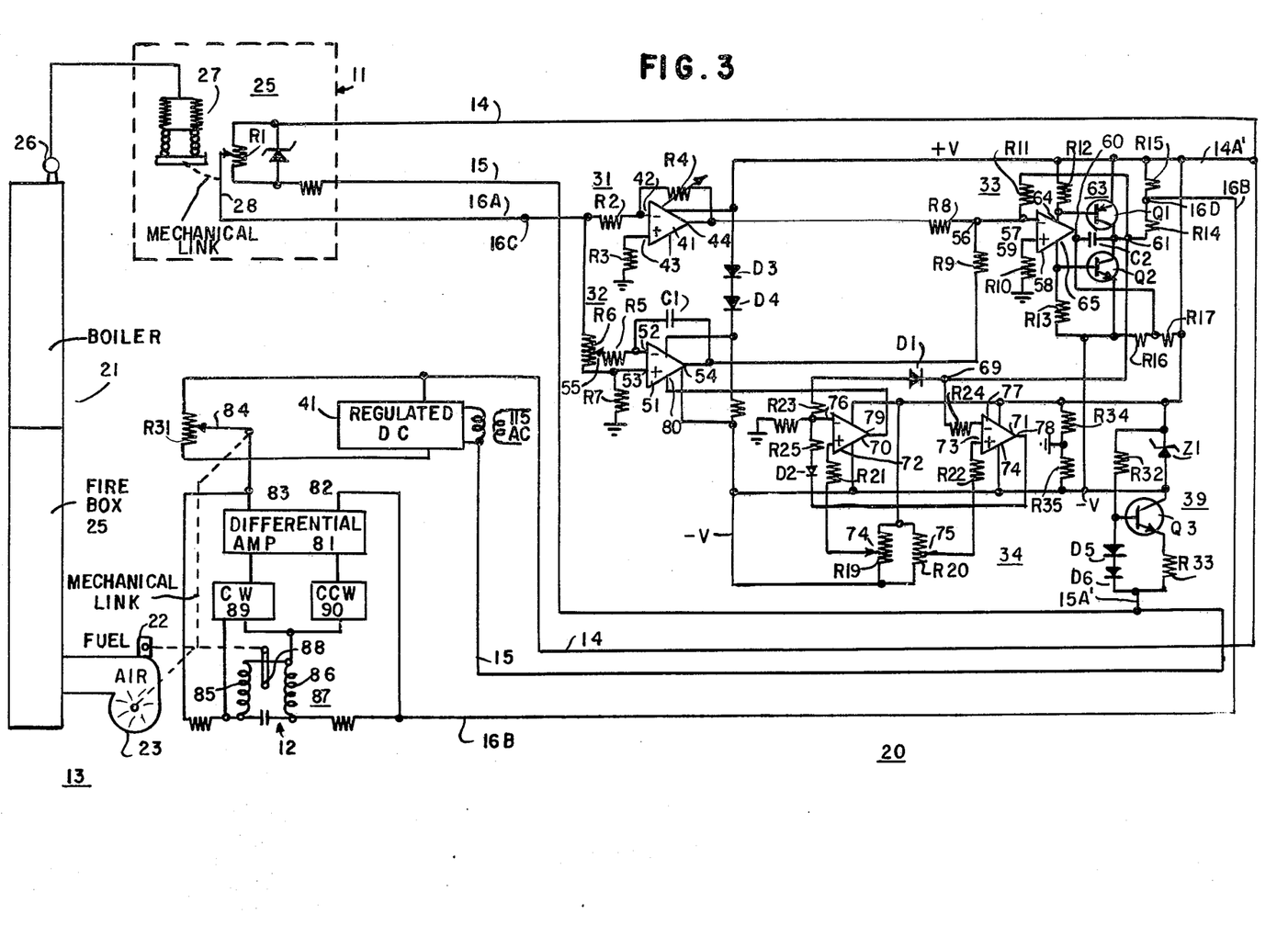

Referring to FIG. 3, there is shown a schematic circuit diagram of the controller 20 provided by the present invention. The controller 20 is shown connected in a proportional control loop which is employed to control the operation of a steam boiler indicated generally at 21. The control loop, including the proportional sensor 11, the controller 20, and the actuator 12 is operable to maintain a pressure in the boiler 21 within a predetermined range. The proportional sensor 11 includes a pressure monitoring device 25 which is mechanically setable to a predetermined set point. The pressure monitoring device 25 is operable to convert pressure to an electrical signal, proportional to the pressure in the boiler 21, the signal being extended to the controller 20 over conductor 16A.

The controller 20 includes a proportional amplifier 31, an integrating amplifier 32 and a summing amplifier 33. The proportional amplifier 31 is responsive to the command signal to provide an output proportional to the command signal, and the integrating amplifier 32 is responsive to the command signal to provide an output signal proportional to the time integral of the command signal. The signals provided by the proportional amplifier 31 and the integrating amplifier 32 are combined by the summing amplifier 33 which provides an output signal having proportional plus integral components which is extended to the actuator 12 over conductor 16B.

In addition, the controller 20 includes a comparator circuit 34 including a pair of amplifiers 70 and 71, which are operable to compare the output of summing amplifier 33 with first and second reference levels, respectively. In normal operation, the proportional plus integral signals sum to a value less than a full scale output for the summing amplifier 33, and the controller 20 operates as any other proportional plus integral controller. Whenever the output of the summing amplifier 33 reaches either the first or second reference level, the comparator circuit 34 effects disabling of the integrating amplifier 32 to temporarily inhibit the generation of the integral component of the output signal provided by the insertion integrator 20. Such action occurs whenever the command signal supplied to the controller 20 by the sensor controller 11 is sufficient to produce a full scale output from the porportional amplifier 31. At such time, the summing amplifier output is also full scale and the integrating amplifier 32 is disabled by the comparator circuit. When the integrating amplifier 32 is disabled, an integrating capacitor C1 of the integrating amplifier 32 is permitted to discharge. In the event of a saturated condition, the capacitor C1 is fully discharged. Accordingly, when the output level of the summing amplifier 33 decreases below the detection level of the comparator circuit 34, in response to a decrease in the command signal, the system is under proportional control the instant the controlled variable is returned to the proportional band, since the integrating amplifier 32 is unwound.

Thus, if the command signal is sufficient to produce a full scale output from the proportional amplifier 31, then the summing amplifier provides a full scale output having proportional only components since the integrating amplifier 32 is disabled. If on the other hand the proportional signal is very small but the integrating signal is large, the summing amplifier can reach the limiting value again and the integrating output holds at the average limited value with a very small amplitude cycle. If the proportional amplifier output is some intermediate value, then the integrating amplifier output is limited to the value which provides nominal full scale output for the summing amplifier 33.

DETAILED DESCRIPTION

Referring to FIG. 3, the proportional plus integral controller 20 is described with reference to an application in a proportional control loop for maintaining the pressure in the boiler 21 within a predetermined range. Heating for the boiler 21 is controlled by the actuator 12 which operates a fuel valve 22 and a burner 23 to supply a predetermined fuel and air mixture to a fire box 25 of the boiler 21. The steam pressure in the boiler 21 is a function of the amount of fuel supplied to the fire box 25. The pressure in the boiler 21 is monitored by a pressure gauge 26 which provides a mechanical output to the proportional sensor controller 11.

The sensor controller 11 includes a pressure monitoring diaphram 27 which is mechanically linked to the pressure gauge 26 and which is mechanically setable to a predetermined set point. The diaphram 27 is mechanically linked to a wiper 28 of a slide wire potentiometer R1 which serves to convert pressure to an electrical signal which is proportional to the pressure in the boiler 21. The proportional sensor controller 11 may be the type P-80 controller commercially available from Penn Controls Inc. The sensor controller 11 provides a DC command signal over conductor 16A which may vary over a range of from zero to −16 volts. The sensor controller 11 obtains power from the actuator 12 over conductors 15 and 14.

The command signal provided on conductor 16A by the sensor controller 11 is extended to inputs of the proportional amplifier 31 and the integrating amplifier 32 of the controller 20. The proportional amplifier 31 includes an operational amplifier 41 having an inverting input 42, a non-inverting input 43 and an output 44. An input resistor R2 is connected between terminal 16C and the inverting input 42 of the amplifier 43. A reference level is established for the amplifier 43 by a resistor R3 which is connected between the non-inverting input 43 of amplifier 41 and ground which is established by resistors R34 and R35 which are equal thus ground is −8v from conductor 14. The center of potentiometer R1 in sensor 11 is also 8v from conductor 14. The gain of the amplifier 41 is controlled by a variable resistor R4 which is connected between output 44 of amplifier 41 and the inverting input 42 of the amplifier 41.

The integrating amplifier circuit 32 includes a further operational amplifier 51 having an inverting input 52, a non-inverting input 53 and an output 54. The non-inverting input 53 is connected over the resistance portion of a potentiometer R6 to terminal 16C and over a resistor R7 to ground. The inverting input 52 is connected over resistor R5 to a wiper 55 of potentiometer R6 which sets the integrating rate for the integrating cirucit 32. An integrating capacitor C1 is connected between the output 54 of amplifier 51 and the input 52 of the amplifier 51.

Power is supplied to amplifiers 41 and 51 over a positive bus +V and a negative bus −V. A current source regulator circuit 39, comprised of a transistor Q3, a Zener diode Z1 and associated bias elements, including resistors R32, R33 and diodes D5, D6 is connected between conductors 15A' and 14A' to supply regulated current for the circuits of the controller 20 over the positive bus +V and the negative bus −V. The positive bus +V is maintained at ground potential, and the negative bus −V is maintained at −16 volts.

The proportional amplifier 41 may be the Type 741 Operational Amplifier, commercially available from Fairchild Semiconductor, and the integrating amplifier 51 may be the Type 776 Programmable Operational Amplifier, commercially available from Fairchild Seniconductor. The integrating amplifier 51 has a control input 80 which is connected to an output of the comparator circuit 34 which supplies bias current for the amplifier 51 in a manner to be described hereinafter. The operational amplifier 51 is turned on whenever current is drawn from terminal 80. Interruption of current flow from terminal 80 causes the amplifier 51 to be turned off, thereby disabling the integrating amplifier circuit 32.

When the command signal, which is representative of the value of the controlled variable, is within the proportional control band of the system, the proportional amplifier 31 is responsive to the command signal to provide an output signal which is proportional to the command signal. In addition, as capacitor C1 charges with the command signal, the integrating amplifier 32 provides a signal which is proportional to the time integral of the command signal which is zero at −8v from positive bus 14 (integrator ground).

The signal output of the proportional amplifier 31 and integrating amplifier 32 are extended over resistors R8 and R9, respectively, to a summing point 56 which is connected to the inverting input 57 of an operational amplifier 58 which comprises the summing circuit 33.

Amplifier 58 has a non-inverting input 59 connected over a resistor R10 to ground. The output 60 of amplifier 58 is coupled over a capacitor C2 to a point 61 at the output of the summing circuit 33. A feedback resistor R11 is connected between point 61 at the output of the summing circuit 33 and the inverting input 57 of the amplifier 58.

The summing amplifier 58 is followed by an output drive stage 63 consisting of transistors Q1 and Q2 and resistors R12 and R13 which supply drive current to load resistors R14-R15. Resistor R12 is connected between the positive bus +V and a positive supply terminal 64 of the amplifier 58 and resistor R13 is connected between the negative bus −V and a negative supply terminal 65 of the amplifier 58.

Transistor Q1, which is normally non-conducting, has its emitter base circuit connected in shunt with resistor R12, and its collector connected to point 61 at the output of the amplifier circuit 33. Similarly, transistor Q2, which is also normally non-conducting, has its base-emitter circuit connected in shunt with resistor R13 and its collector connected to point 61 at the output of the amplifier circuit 33.

Whenever a positive output swing is called for by the operational amplifier 58, the amplifier 58 draws current from terminal 64 and delivers it to the load resistors R16-R17 when the voltage drop across resistor R12 increases due to such demand, transistor Q1 is turned on causing the output signal to swing in a positive direction. Transistor Q2 operates in a similar way to supply power to the load from the negative supply for negative swings.

The full scale output of the summing circuit 33 at point 61 may swing between very nearly zero and −16 volts. The load resistors R14-R15 serve as a voltage divider to provide a voltage swing between zero and −2 volts at terminal 16D which is extended to the actuator 12 over conductor 16B.

The output of the summing circuit 33 at point 61 is extended to an input of the comparator circuit 34 at point 69. The comparator circuit 34 includes two comparator amplifiers 70 and 71 which are the Type 741 operational amplifiers, operating without feedback, having non-inverting inputs 72 and 73, respectively, set to two fixed reference levels provided by a pair of reference potentiometers R19, R20, which may be −7.7 volts and +7.7 volts, respectively. Potentiometer 19 has a resistance portion connected between the positive bus +V and the negative bus −V and a wiper 74 connected over a resistor R21 to the non-inverting input 72 of amplifier 70. Similarly, potentiometer R20 has a resistance portion connected between the positive bus +V and the negative bus −V and a wiper 75 connected over a resistor R22 to the non-inverting input 73 of amplifier 71. The inverting input 76 of amplifier 70 is connected over a resistor R23 and a decoupling diode D1 to point 69.

The inverting input 76 of amplifier 70 is also connected over a resistor R25 and a decoupling diode D2 to the output 78 of amplifier 71. The inverting input 77 of amplifier 71 is connected over a resistor R24 to point 69. The output 79 of amplifier 70 is extended to the control input 80 of the integrating amplifier 51. The comparator amplifier 70 is normally maintained in a saturated condition providing a negative output and comparator amplifier 71 is normally maintained in a saturated condition providing a positive output. Diodes D1 and D2 serve as decoupling diodes to decouple the signals to the appropriate comparator amplifiers 70, 71 when they are of a polarity which is not used for limiting. This enables the comparator circuit 34 to be sensitive only to the proper signal at the preestablished level as determined by the reference potentiometers R19, R20. Comparator amplifier 70 is responsive to signals which decrease below a predetermined negative level and comparator amplifier 71 is responsive to output signals which increase above a predetermined positive level.

Whenever the output from the summing amplifier 33 reaches either the positive or negative reference levels established for the comparator amplifiers 70 and 71 by associated reference potentiometers R19 and R20, respectively, the appropriate comparator amplifier 70 or 71 suddenly flops to opposite saturation, causing amplifier 70 to provide a positive output. The comparator circuit 34 is operable such that if either reference level is reached, the normally negative output of comparator amplifier 70 is switched to a positive output, and this positive output is sufficient to disable the integrating amplifier 51. It is pointed out that since the output of the comparator amplifier 70 cannot reach the level of the positive supply +V, the programmable operational amplifier 51 is supplied with less than the full positive supply +V through the use of level shifting diodes D3 and D4 which are connected in series between the positive supply +V and the positive bias input of the amplifier 51.

Whenever the integrating amplifier 51 is disabled, the integrating capacitor C1 discharges toward ground at each end. The summing point 56 is always close to ground potential whenever the integrating amplifier 51 is enabled because the non-inverting terminal 53 is referenced to ground over resistor R7. The capacitor C1 discharges through the summing resistor R9 of the summing amplifier 58 with a time constant R9 C1. When the output of the summing amplifier 58 decreases due to the disabling of the integrating amplifier 51, the signal supplied to the comparator amplifiers 70 or 71 drops below the comparator trip point, causing the appropriate comparator amplifier to flop to opposite saturation, such that comparator amplifier 70 provides a negative output permitting the integrating amplifier 51 to be enabled. For conditions approaching saturation, this cycle is repeated rapidly over a small increment of voltage which depends upon the gain of the comparator amplifiers 70, 71 and the RC time constant of the integrating capacitor C1 and resistor R6. In effect, this limits the output of the summing amplifier 33 to a maximum value set by the comparator reference potentiometers R19 and R20. The amplitude of charge and discharge voltage on the capacitor C1 may, for example, be approximately 100 millivolts.

As indicated above, the modified command signal provided at the output of the controller 20 at terminal 16D is extended to the actuator circuit 12 over conductor 16B. The actuator 12 may be a motor actuator circuit such as the type disclosed in the U.S. Pat. No.

3,742,327, of R. G. Nettles, which was issued on June 26, 1973. Briefly, the motor actuator circuit 12 is comprised of a differential amplifier 81 having a first input 82 connected over conductor 16B to the output of the summing amplifier 33 at point 16D to receive the command signal. A second input 83 of the differential amplifier 81 is connected to a wiper 84 of a potentiometer R31 which provides a reference signal for the differential amplifier 81. The differential amplifier 81 is responsive to a difference in the command signal relative to the reference signal of either positive or negative polarity to effect the enabling of windings 85 and 86 of the motor 87 to effect clockwise or counter-clockwise rotation of the motor shaft 88. The differential amplifier 81 effects selective energization of motor drive circuits 89 and 90 to effect clockwise or counter-clockwise rotation of the shaft 88. The motor shaft 88 is mechanically linked to the fuel valve 22 and the damper 23 to effect a change in the amount of heating supplied to the boiler 21 by varying the fuel mixture supplied to the fire box 25. Accordingly, an increase or decrease in the amount of heating in the boiler 21 effects a change in the steam pressure to return the steam pressure to the system set point as established by the sensor controller 25.

OPERATION OF THE PROPORTIONAL PLUS INTEGRAL CONTROLLER

Assuming initially that the difference between the actual pressure in the boiler 21 and the system set point is such that the command signal provided by the proportional sensor 11 is within the proportional band of the system, then the command signal is less than zero volts and greater than −16 volts. Accordingly, both the proportional amplifier 31 and the integrating amplifier 32 are operable to enable the proportional plus integral controller 20 to provide a modified command signal having proportional and integral components. The proportional component, provided by proportional amplifier 31 is K Vin which is proportional to the command signal, and the integral component provided by the integrating amplifier 32 is K Vin dt which is proportional to the time integral of the command signal. The signal Vin is defined as the difference between the ground references for the operational amplifiers 41 and 58, and the voltage on conductor 16A. The proportional and integral components are summed by the summing circuit 33 which provides the modified command signal having proportional and integral components. In such case, the output of the summing amplifier 33 is not full scale, and the integrating amplifier 32 is enabled.

The modified command signal provided at the output of the summing amplifier 33 is extended to the actuator 12 over conductor 16B. For a positive difference in excess of a small predetermined value between the modified command signal extended to input 82 of the differential amplifier 81, and the reference signal established by potentiometer R31 at input 83 of the amplifier 81, one of the drive circuits 89, 90, such as drive circuit 89, is enabled to effect clockwise rotation of the motor shaft 88 causing a decrease, for example, in the amount of fuel mixture supplied to the fire box 25. Such decrease in the heating capability of the boiler 21 results in a decrease in the steam pressure so that the actual steam pressure approaches the system set point causing a corresponding reduction in the command signal provided by the proportional sensor 11. A similar operation ensues for non-saturated conditions where the actual steam pressure is lower than the system set point with the actuator 12 being enabled to increase the amount of fuel mixture supplied to the fire box 25 to thereby effect an increase in the steam pressure to compensate for such difference.

Considering now a saturated condition, when the boiler 21 is out of control for some extended time, such as during start-up or during a saturated over-load period, the command signal provided by the sensor 11 is full scale, such as −16 volts for example. Accordingly, the proportional amplifier 31 is also driven to full scale, causing the output of the summing amplifier 33 to be full scale value of −16 volts at point 61. When the potential at point 61 reaches the negative reference level established by potentiometer R19 of the comparator cirucit 34, the comparator amplifier 70 flops to opposite saturation, providing a positive output which disables the integrating amplifier 51.

Accordingly, amplifier 51 is turned off permitting capacitor C1 to discharge over resistor R9 since the non-inverting terminal 58 of the amplifier is at ground potential. This discharge continues a small increment until the output level of the summing amplifier drops below the comparator trip point and the comparator amplifier 70 flops to opposite saturation providing a negative output which allows the integrator amplifier 51 to turn on. When the controlled variable is close to being within the proportional band, as the result of a small load change, for example, this cycle is repeated rapidly over a small increment of voltage which depends on the comparator gain and the time constant C1 R9. In effect, this limits the output of the summing amplifier 33 to a maximum value set by the comparator potentiometer R19. When the controlled variable remains out of the proportional band for an extended period of time, as during start-up, the disabling of the integrator 32 is insufficient to drop the output level of the summing amplifier to a value below the comparator trip point and the integrator 32 remains disabled and capacitor C1 becomes discharged.

It is pointed out that since the output of the summing amplifier 34 is the sum of the proportional and integral components provided by amplifiers 31 and 32, the output of the integrator 32 can increase only to a point at which the sum of the proportional and integral components reach the comparator trip point. Once the comparator circuit 34 trips, the integrator circuit 32 is disabled and the capacitor C1 begins to discharge.

If the input signal supplied by the sensor 11 is sufficient to produce a full scale output from the proportional amplifier 31, then the summing amplifier output is also full scale and the integrator 32 is turned off with the integrating capacitor C1 discharging. If the proportional signal is very small, but the signal provided by the integrator amplifier 32 is large, then the output of the summing amplifier 34 can only reach the limiting values and the output established by the comparator circuit 34, and the integrator circuit 32 cycles at the limited value. If the output of the proportional amplifier 31 is some intermediate value, the output of the integrator amplifier 32 is always limited to the value that produces a nominal full scale output within the limit settings of the summing amplifier 33. It is pointed out the limiting action occurs only when the summing amplifier output is full scale. At such point, the system is already out of control since, for example, the motor 87 of the actuator 12 has been driven to full scale. Under normal conditions, the proportional plus integral signals sum to something less than full scale output for the summing amplifier 33, and the controller 20 operates as any other proportional plus integral controller.

Under the saturated conditions set forth above, wherein the command signal from the sensor controller 11 is full scale for an extended period of time, and the output of the proportional amplifier 31 is also full scale, the integrating amplifier 32 is automatically turned off by the comparator circuit 34 as described, and the capacitor C1 is discharged to zero. If the controlled variable then returns rapidly to the proportional control band, the decrease in the command signal effects a corresponding decrease in the output of the summing amplifier 33 enabling the integrating amplifier 32 to be enabled. At such time, the integrating amplifier 32 starts from zero volts instead of from full scale output and accordingly, the system is under proportional control the instant the controlled variable returns to the proportional band and there is no waiting for the integrating circuit 32 to unwind.

I claim:

1. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional means responsive to said command signal to provide a first signal proportional to said command signal, integral means operable when enabled to be responsive to said command signal to provide a second signal that varies in proportion to the time integral of the command signal, summing means for summing said first and second signals to provide a modified command signal for said actuator means and control means for normally enabling said integral means to provide said second signal, said control means having a first means for providing at least one reference signal of a predetermined value and second means for comparing said modified command signal with said reference signal and for controlling said integral means to vary the amplitude of said second signal by disabling said integral means whenever said modified command signal exceeds said predetermined value.

2. A process control system as set forth in claim 1 wherein said integral means comprises programmable operational amplifier means having an integrating capacitor means connected between a first input and an output of said operational amplifier means which is connected to said summing means, input means connected between said first amplifier input and an output of said sensor means for extending said command signal to said operational amplifier means to permit said integrating capacitor means to charge to a value related to the time integral of said command signal to provide said second signal at said output of said operational amplifier means whenever said operational amplifier means is enabled, said second means being operable to disable said operational amplifier means to permit said capacitor means to discharge over said summing means whenever said modified command signal exceeds said predetermined value.

3. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional means responsive to said command signal to provide a first signal that is proportional to said command signal, integral means having an input and an output, circuit means including integrating capacitor means connected between said input and said output, said integral means being operable when enabled to be responsive to said command signal to permit said capacitor means to charge to a value related to time changes of said command signal whereby said integral means provides a second signal that is proportional to the time integral of the command signal, summing means for summing said first and second signals to provide a modified command signal, and control means responsive to said modified command signal and operable to control said integral means to limit the amplitude of the second signal to a value which enables said summing means to normally provide a modified command signal of an amplitude that is between predetermined first and second values which define a proportional band for the controller means, and said control means disabling said integral means thereby permitting said capacitor means to discharge to cause the potential at said input and said output to decrease to substantially zero for reducing said second signal to zero whenever the amplitude of the modified command signal exceeds either one of said first and second predetermined values.

4. A process control system as set forth in claim 3 wherein said integral means further comprises amplifier means, said integrating capacitor means being connected between an input of said amplifier means and an output of said amplifier means, and an input network means for extending said command signal to said amplifier means to permit said capacitor means to charge to a value related to the time integral of the command signal, said summing means providing a discharge path for said capacitor means whenever said amplifier means is disabled, and said amplifier means being controlled by said control means to enable said capacitor means to discharge to zero over said discharge path whereby the potential at said input and said output of said amplifier means is substantially zero whenever said modified command signal exceeds either one of said predetermined values for at least a predetermined time.

5. In a process control system having a proportional control loop including sensor means for monitoring a controlled variable and for providing a linearly changing command signal indicating deviations of the controlled variable from a system set point, an actuator means responsive to the command signal to control a manipulated variable to effect a change in the controlled variable to return the controlled variable to the set point, a proportional plus integral controller means comprising proportional means including proportional amplifier means responsive to said command signal to provide a first signal which is proportional to the command signal, integral means including integrating amplifier means having an input and an output, and integrating capacitor means connected between said input and said output of said integrating amplifier means, said integrating amplifier means being operable when enabled to permit said capacitor means to be charged by said command signal to provide a second signal that varies in proportion to the time integral of the command signal, summing amplifier means for summing said first and second signals to provide a modified command signal for said actuator means, and signal comparator means including reference means for providing a reference signal, and at least one signal comparator amplifier means for comparing said modified command signal with said reference signal and operable in response to a first predetermined difference between said modified command signal and said reference signal to control said integrating amplifier means to respond to said command signal to provide said second signal, and said signal comparator amplifier means being operable in response to a second predetermined difference between said modified command signal and said reference signal to disable said integrating amplifier means to permit said capacitor means to discharge to zero to thereby permit the potential at said input and said output of said integrating amplifier means, and thus the amplitude of said second signal to decrease to zero.

6. A process control system as set forth in claim 5 wherein said integrating amplifier means comprises a programmable operational amplifier, said integrating capacitor means being connected between said output of said operational amplifier means and said input of said operational amplifier means, and input network means for extending said command signal to said programmable operational amplifier means, said output of said operational amplifier means being connected to said summing means to permit said second signal to be extended to said summing means and for providing a discharge path for said capacitor means whenever said integrating amplifier means is disabled.

7. In a process control system having proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional amplifier means responsive to said command signal to provide a first signal which is proportional to the command signal, integrating amplifier means operable when enabled to be responsive to said command signal to provide a second signal that varies in proportion to the time integral of the command signal, summing amplifier means for summing said first and second signals to provide a modified command signal for said actuator means, said integrating amplifier means comprising a programmable operational amplifier means having an integrating capacitor means connected between an output of said operational amplifier means and an input of said operational amplifier means, and input network means for extending said command signal to said operational amplifier means to permit said integrating capacitor means to charge to a value related to time changes of said command signal whenever said operational amplifier means is enabled, said output of said operational amplifier means being connected to an input of said summing amplifier means to permit said second signal to be extended to said summing amplifier means and for providing a discharge path for said capacitor means, and signal comparator means including reference means for providing a reference signal, and at least one signal comparator amplifier means for comparing amplifier means said modified command signal with said reference signal, said operational amplifier means having a control input, and said signal comparator amplifier means being operable to normally extend an enabling signal to said control input for enabling said first operational amplifier means in response to a first predetermined difference between said modified command signal and said reference signal, said signal comparator amplifier means being operable to extend a disabling signal to said control input for disabling said operational amplifier means in response to a second predetermined difference between said modified command signal and said reference signal to disable said programmable operational amplifier means to permit said capacitor means to discharge over said discharge path.

8. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional means responsive to the said command signal to provide a first signal proportional to said command signal, integral means operable when enabled to be responsive to said command signal to provide a second signal that varies in proportion to the time integral of the command signal, summing means for summing said first and second signals to provide a modified command signal for said actuator means, and control means for normally enabling said integrating means, said control means including a first and a second signal comparator means and a first and a second reference means for supplying first and a second reference signals to said first and second signal comparator means respectively, said first and second comparator means being operable to compare said modified command signal with the reference signal extended thereto and to disable said integral means in response to a predetermined difference between said modified command signal and said reference signal, said first signal comparator means being operable to effect disabling of said integral means whenever said modified command signal is a predetermined amount greater than said first reference signal, and said second signal comparator means being operable to effect disabling of said integral means whenever said modified command signal is a predetermined amount less than said second reference signal.

9. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional means responsive to said command signal to provide a first signal proportional to said command signal, integral means comprising a programmable operational amplifier means having an integrating capacitor means connected between a first input and an output of said operational amplifier means, input means connected between said first amplifier input and an output of said sensor means for extending said command signal to said operational amplifier means to permit said integrating capacitor means to charge to a value related to the time integral of said command signal whenever said operational amplifier means is enabled to permit said integral means to provide a second signal that varies in proportion to the time integral of the command signal, summing means for summing said first and second signals to provide a modified command signal for said actuator means, and control means having a first means for providing at least one reference signal, and a second means for comparing said modified command signal with said reference signal, said programmable operational amplifier means having a control input connected to an output of said second means, said second means normally providing a first output to said control input for enabling said programmable operational amplifier means, and said second means being operable to provide a second output to said control input for disabling said programmable operational amplifier means in response to said predetermined difference between said modified command signal and said reference signal.

10. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, a proportional plus integral controller means comprising proportional amplifier means responsive to said command signal to provide a first signal which is proportional to the command signal, integrating amplifier means operable when enabled to be responsive to said command signal to provide a second signal that varies in proportion to the time integral of the command signal, said integrating amplifier means comprising a first programmable operational amplifier means having a control input, an integrating capacitor means connected between an output of said first operational amplifier means and an input of said first operational amplifier means and input network means for extending said command signal to said first operational amplifier means to permit said integrating capacitor means to charge to a value related to time changes of said command signal whenever said first operational amplifier means is enabled, summing amplifier means for summing said first and second signals to provide a modified command signal for said actuator means, and signal comparator means including reference means for providing a reference signal, a second operational amplifier means, a first input means for extending said modified command signal to a first input of said second operational amplifier means and second input means for extending said reference signal to a second input of said second operational amplifier means, said second operational amplifier means having an output connected to said control input of said programmable operational amplifier means, said second operational amplifier means being operable to compare said modified command signal with said reference signal and to normally provide a signal to said control input for enabling said first operational amplifier means in response to a first predetermined difference between said modified command signal and said reference signal, and to extend a signal to said control input for disabling said operational amplifier means in response to a second predetermined difference between said command signal and said reference signal.

11. A process control system as set forth in claim 7 wherein said signal comparator means comprises a third operational amplifier means having a third input means for connecting a first input of said third operational amplifier means to the output of said summing amplifier means and fourth input means for connecting a second input of said third operational amplifier means to said further reference means for receiving a further reference signal, and means for connecting the output of said third operational amplifier means to said first input of said second operational amplifier means over said first input means, said third operational amplifier means being responsive to a further predetermined difference between said modified command signal and said further reference signal to enable said second operational amplifier means to effect disabling of said programmable operational amplifier means.

12. A process control system as set forth in claim 11 which includes means for providing a discharge path for said integrating capacitor means whenever said programmable operational amplifier means is disabled.

13. A process control system as set forth in claim 12 wherein said second operational amplifier means is normally operable in a saturated condition to provide a negative output for said control input, and said third operational amplifier means is normally operable in a saturated condition to provide a positive output for said second operational amplifier means, said third operational amplifier means being responsive to said second predetermined difference to be switched to an opposite saturation condition to thereby provide a negative output for said second operational amplifier means causing said second operational amplifier means to switch to an opposite saturation condition thereby providing a positive output to said control input for disabling said programmable operational amplifier.

14. A process control system as set forth in claim 11 which includes means for supplying power to said programmable operational amplifier to enable said second and third operational amplifier means to control the enabling of said programmable operational amplifier means.

15. A process control system as set forth in claim 11 which includes decoupling means for preventing said second operational amplifier means from responding to said further predetermined difference between said modified command signal and said further reference signal.

16. In a process control system as set forth in claim 8 having a proportional control loop including sensor means for monitoring a controlled variable and for providing a linearly changing command signal indicating deviations of the controlled variable from a system set point, an actuator means responsive to the command signal to control a manipulated variable to effect a change in the controlled variable to return the controlled variable to the set point, a proportional plus integral controller means comprising proportional amplifier means responsive to said command signal to provide a first signal which is proportional to the command signal, integrating amplifier means operable when enabled to be responsive to said command signal to provide a second signal that varies in proportion to the time integral of the command signal, summing amplifier means for summing said first and second signals to provide a modified command signal for said actuator means, and signal comparator means including at least one signal comparator amplifier means and reference means for providing a reference signal for said signal comparator amplifier means, said signal comparator amplifier means being operable to compare said modified command signal with said reference signal and to enable said integrating amplifier means in response to a first predetermined difference between said modified command signal and said reference signal and to disable said integrating amplifier means in response to a second predetermined difference between said modified command signal and said reference signal, said proportional plus integral controller means being interposed between said sensor controller means and said actuator means and and obtaining power from said actuator means.

* * * * *

UNITED STATES PATENT AND TRADEMARK OFFICE
CERTIFICATE OF CORRECTION

PATENT NO. : 3,938,017
DATED : February 10, 1976
INVENTOR(S) : Thomas Edward Hayes It is certified that error appears in the above-identified patent and that said Letters Patent are hereby corrected as shown below:

Column 16, line 54, "as set forth in claim 8" should be deleted.

Signed and Sealed this

Seventh Day of September 1976

[SEAL]

Attest:

RUTH C. MASON
*Attesting Officer*

C. MARSHALL DANN
*Commissioner of Patents and Trademarks*